H. J. HEIDER.
DRAFT EQUALIZER.
APPLICATION FILED NOV. 9, 1907.
952,900.
Patented Mar. 22, 1910.
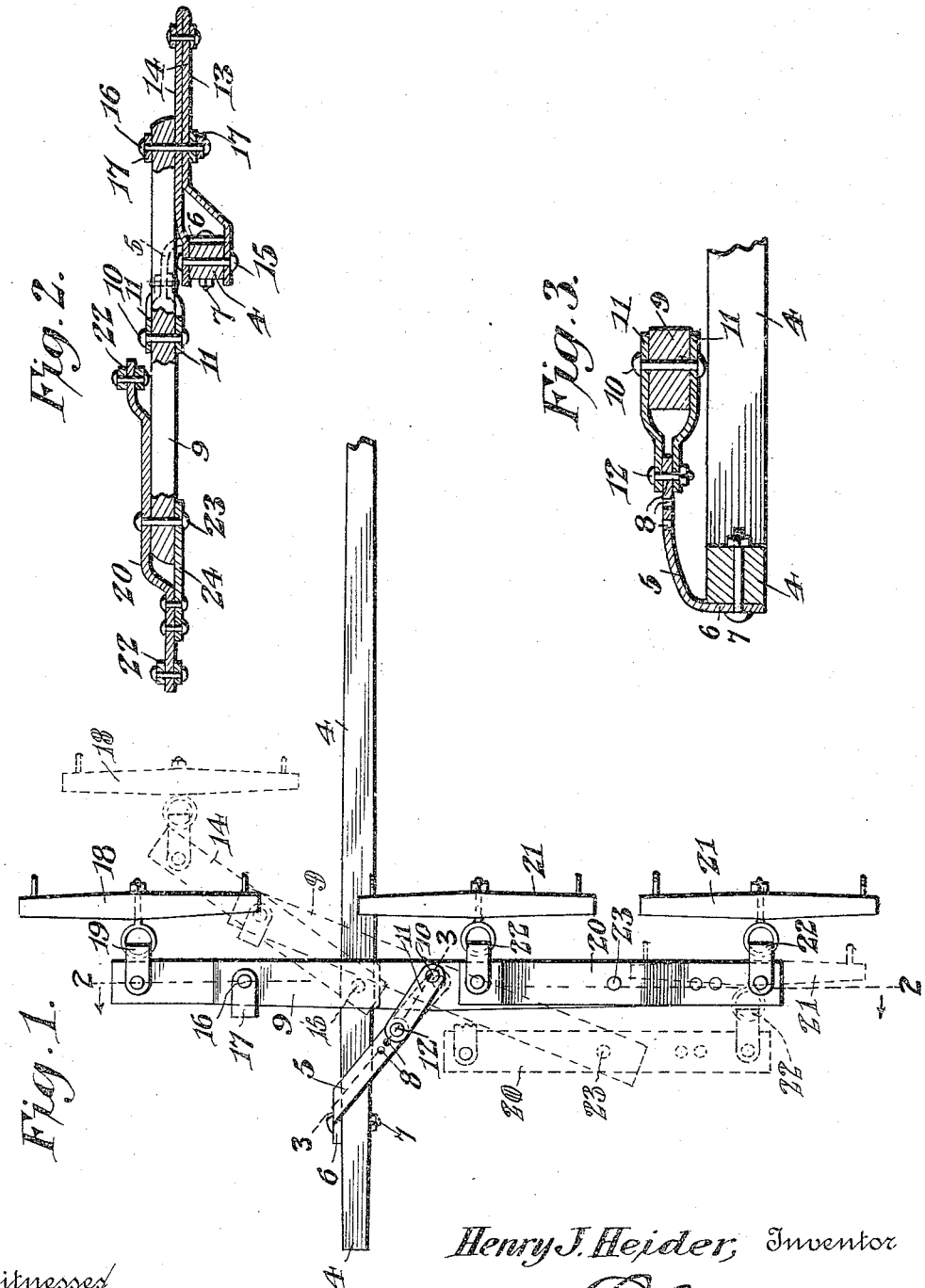
Henry J. Heider, Inventor

UNITED STATES PATENT OFFICE.

HENRY J. HEIDER, OF CARROLL, IOWA, ASSIGNOR TO HEIDER MFG. CO., OF CARROLL, IOWA, A CORPORATION OF IOWA.

DRAFT-EQUALIZER.

952,900.  Specification of Letters Patent.  Patented Mar. 22, 1910.

Application filed November 9, 1907. Serial No. 401,448.

*To all whom it may concern:*

Be it known that I, HENRY J. HEIDER, a citizen of the United States, residing at Carroll, in the county of Carroll and State of Iowa, have invented a new and useful Draft-Equalizer, of which the following is a specification.

This invention relates to draft equalizers and the object is to provide a novel, simple and entirely practicable combination of elements, which will provide effective means whereby a plurality of draft animals can be hitched abreast with a greater number on one side of the tongue of a vehicle than the other and yet cause the draft to be concentrated at all times toward the central line of the tongue or pole, and wherein the tongue will support the weight of the draft appliances.

The preferred embodiment is shown in the accompanying drawings, wherein:—Figure 1 is a plan view of the draft equalizer applied to the tongue. Fig. 2 is a sectional view on the line 2—2 of Fig. 1. Fig. 3 is a sectional view on the line 3—3 of Fig. 1.

Similar reference numerals designate corresponding parts in all the figures of the drawings.

In the embodiment disclosed, the support, which is in the form of a tongue, is designated by the reference numeral 4. A bracket arm 5, extending diagonally across the rear portion of the tongue and having its free end located at one side of the same, has a depending terminal 6 located on the opposite side of the tongue, and secured thereto by a bolt 7 or other suitable fastener. The free end of the bracket arm is provided with a series of openings 8. A draft beam 9 is disposed transversely of the tongue and pivotally connected to its center, as shown at 10, are links 11 that are disposed longitudinally of the bracket arm 5, and have their rear ends embracing the front end of said arm. A pivot 12 connects the said ends of the links and arm, said pivot being placed in any of the openings 8. A lever 13, preferably doubled to form a pair of plates or arms 14, has its inner end fulcrumed, as shown at 15 on the tongue in advance of the connection of the bracket with said tongue, the inner ends of the arms 14 of the lever embracing the tongue, as illustrated in Fig. 2. This lever is located directly beneath the adjacent end of the evener beam, and has a connection between its ends with the adjacent end of said beam, said connection comprising a pivot bolt 16, and a U-shaped clip 17 secured by the bolt and embracing the lever and beam. A suitable draft device, shown in the form of a whiffletree 18 has a pivotal connection 19 with the free end of the lever, which projects beyond the beam, and a doubletree 20, pivoted on the opposite end of the evener beam, has swingletrees 21 pivotally connected, as shown at 22, to its ends.

The pivot for the doubletree is shown at 23, and it will be observed that the outer arm of said doubletree is down-set, and has a brace connection 24 with the lower end of the pivot bolt. The pivoted connection 16, between the beam and the lever, is substantially midway between the connection of the swingletree 18 with the lever, and the pivot connection of the latter with the tongue. With this construction, it will be noted that while the evener beam is fulcrumed or pivoted at one side of the tongue, and has a swinging link connection with the bracket, it is held against direct longitudinal movement by the lever 13. With this peculiar connection therefore, all the parts can freely swing to accommodate the movements of the horses or other draft animals. This structure is moreover simple and is readily applicable to any vehicle or implement tongue.

In addition to the above, a rigid metallic bar or bracket, as 5, is important, as it not only forms a draft strap, but also acts as a support to hold up the long and heavier end of the evener beam, so that when the draft thereon is released, the same will not drop to the ground and interfere with the movement of the horses. The fastening of this rigid bracket to the opposite side of the tongue to that from which said bracket projects is also advantageous, as it constitutes a bearing against the side of the tongue, which eliminates the danger of splitting the tongue on a hard pull or of breaking the bolt 7 which fastens the bracket. The arrangement of the evener beam directly over the lever and its direct pivotal connection with said lever is also important, inasmuch as the lever performs a double function, not only constituting a connection for a whiffletree 18, but also acting as additional supporting means for the evener beam 9, the lower arm of the lever acting as a supporting bracket. As a result, the entire evener is supported on the tongue in proper position, whether there is draft upon the same or not. An additional advantage for having the evener beam and lever in alinement or one over the other, is that the equalizer can be attached in a shorter space to the tongue and closer to the load. Moreover it will be noted that the pivotal connection 16 is located substantially midway between the fulcrum 15 and the connection 19. This permits the evener to work freely and it gives the animals a greater leeway forward and back. The pivotal connection of the evener beam 9 to the lever 13 at the point stated, provides what might be called a short equalizer, giving to the one horse attached to whiffletree 18 the same leverage on evener beam 9, at the left-hand side of the tongue, as the two horses have on the right-hand side.

It will be noted that the doubletree 20 is formed in two parts fastened and pivoted to the end of the evener beam by the bolt 23. The upper part or member of the doubletree extends over the evener beam and has its inner terminal offset vertically. The middle swingletree 21 is pivoted to the offset terminal, and, as a result, it is arranged on a higher plane than the outside swingletrees. By this arrangement, the swingletree of the middle horse is given a chance to see-saw back and forth over the top of the evener beam, and is not stopped by the evener beam, which would cause him not to pull anything at all.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a draft equalizer, the combination with a tongue, of a lever fulcrumed at its inner end to the tongue and projecting from one side of the same, said lever having its inner end connected to both the top and bottom of the tongue, a draft device for a single horse connected to the outer end of the lever, a rigid bracket arm secured to the tongue and extending to the side opposite to the lever, an evener beam located in line with and overlapping the lever and passing across the upper side of the tongue, a link connection between the bracket arm and the evener beam located at one side of the tongue, a pivot passing through the overlapping end of the beam and through the lever between its fulcrum and the draft device and located at one side of the tongue, and draft devices for two horses connected to the free end of the evener beam and arranged at the side of the tongue opposite the single draft device, the pivot connection of the beam with the lever being substantially midway between the connection of the single draft device with the lever and the pivot connection of the lever with the tongue.

2. In a draft equalizer, the combination with a tongue, of a rigid bracket having an offset end secured to one side face of the tongue, extending across the top of the same and projecting beyond the opposite side, an evener beam pivotally connected to said projecting portion of the bracket and extending across the tongue, and a lever fulcrumed on the tongue and pivoted to the portion of the evener beam which extends across said tongue.

3. In a draft equalizer, the combination with a tongue, of a rigid bracket having an offset end secured to one side face of the tongue, said bracket extending diagonally forward across and above the tongue in spaced relation thereto and projecting beyond the opposite side of said tongue to that to which the bracket is secured, an evener beam pivotally connected to said projecting portion of the bracket and extending across the tongue, and a lever fulcrumed on the tongue and pivoted to the evener beam on the opposite side of said tongue to the connection between the beam and bracket.

4. In a draft equalizer, the combination with a tongue, of a rigid bracket disposed diagonally to the tongue and having its free end located at one side of the same, said bracket having a depending ear secured to the opposite side of the tongue, an evener beam extending transversely of the tongue, a pivotal link connection between the evener beam and the free end of the bracket, a whiffletree pivotally mounted on the outer end of the evener beam, a lever fulcrumed at its inner end on the tongue in advance of the bracket and beneath the evener beam, said lever extending on the opposite side of the tongue to the bracket, a pivotal connection between an intermediate portion of the lever and the adjacent end of the evener beam, and a whiffletree connected to the free end of the lever.

5. In a draft equalizer, the combination with a tongue, of a lever comprising a pair of arms having their inner ends embracing and fulcrumed to the tongue, said lever extending to one side of the tongue and having its outer portion in substantial alinement with the top of said tongue, an evener beam located directly in line with and overlapping the lever, a pivot passing directly through one end of the beam and through the lever, and a pivot connection for the beam secured to the tongue and engaged with said beam on the opposite side of the tongue to the lever.

6. In a draft equalizer, the combination with a tongue, of a lever comprising a pair of arms having their inner ends embracing and fulcrumed to the tongue and moving in unison, the lower arm constituting a supporting bracket, said lever extending to one side of the tongue, an evener beam extending across the tongue and located directly in line with and overlapping the lever, a pivot passing directly through one end of the beam and through the lever at one side of the tongue, and a pivotal connection for the beam secured to the tongue and engaged with said beam on the opposite side of said tongue.

7. In a draft equalizer, the combination with a tongue, of a lever having its inner end constructed to embrace the top and bottom of the tongue and arranged transversely at one side thereof, means for pivotally connecting said inner end of the lever to the tongue, a draft appliance connected to the outer end of the lever, an evener beam pivotally connected at one end to the lever between the pivotal connection of the latter to the tongue and its outer end, said evener beam lying above the lever and extending loosely across the tongue and projecting to the side opposite the lever, the major portion of said evener beam lying on that side of the tongue, means for pivotally connecting the evener beam at an intermediate point of its length to the tongue at the side of the tongue opposite the lever, and draft appliances connected with the evener beam at the outer end thereof.

In testimony, that I claim the foregoing as my own, I have hereto affixed my signature in the presence of two witnesses.

HENRY J. HEIDER.

Witnesses:
J. O. HEIDER,
J. J. KEMPKER.